United States Patent Office

2,923,643
Patented Feb. 2, 1960

2,923,643

PRODUCTION OF ANTI-CORROSIVE COATINGS FOR METALS

Robert Hunter Rodwell, London, England, assignor to Hunter and Company (Paints) Limited, London, England No Drawing. Application May 29, 1958
Serial No. 738,644

Claims priority, application Great Britain June 18, 1957

2 Claims. (Cl. 117—70)

This invention relates to the coating of metals particularly iron and steel, with an anti-corrosive coating, and the object of the invention is to provide a coating applicable to pontoons, ships' hulls, metal buildings, structural steel and all similar surfaces which are exposed to varying atmospheric conditions of temperature and humidity.

The invention consists in a process of producing an anti-corrosive coating on metals such as iron and steel which comprises applying to the metal surface, one or more coatings of an aqueous suspension of Portland or like cement which sets on hydration with water, said suspension containing zinc chromate and polyvinyl acetate, and if desired, also a gelling agent such as bentonite and also a wetting agent such as a soap, allowing the coating or coatings to dry and applying to the dried coatings one or more bituminous or resinous coatings.

The polyvinyl acetate may be incorporated in the water employed in making the aqueous suspension of cement.

"White spirit" is defined as an essentially petroleum hydrocarbon fraction of approximately boiling range 140–210° C., known also as mineral spirits and a common constituent thinner of air drying paints and varnishes.

2% aqueous suspension of a polyvinyl acetate paste, which is available on the market, may be employed and this improves the adhesion of the dried cement mix to the metal surface to which it is applied.

Moreover the presence of the polyvinyl acetate in the dried coating enables the bituminous or resinous coating subsequently applied to become firmly adhered thereto.

The invention also consists in a dry mix for carrying out the process, comprising Portland or like cement and zinc chromate and if desired, a gelling agent such as bentonite and a wetting agent such as a dehydrated soap.

In carrying out the present invention the surface to be coated is first treated to remove any corrosion already present and there is then applied to the surface by brushing, spraying, or trowelling, one or more coatings of an aqueous suspension of the cement mix. The cement coating is allowed to become dry and there is then applied to the cement coating one or more coats of a protective composition which may be bituminous in nature, as hereinafter described or alternatively, a selected resin/oil varnish may be used, as hereinafter described, either of which may be pigmented if a coloured surface is desired. Portland cement or other cement which sets on hydration with water may be added to the bituminous or resin/oil coating with advantage.

A suitable cement composition in the form of a dry mix may comprise the following in which the parts are by weight:

*Example 1*

96 parts Portland cement
3 parts zinc chromate
.98 part bentonite (preferably by Wyoming origin)
.02 part dehydrated potassium oleate This is made into a paste or slurry with water to which about 2% of polyvinyl acetate is added. The surface to be treated is evenly coated with the slurry.

Suitable bituminous compositions may comprise the following in which the parts are by weight:

*Example 2*

45 parts residual bitumen. An appropriate grade for average use would have a ring and ball softening point of approximately 250° F. but this may vary as required
53 parts solvent, such as white spirit or a suitable coal tar solvent
2 parts Portland cement or like substance which sets on hydration with water

*Example 3*

30 parts residual bitumen, with a ring and ball softening point of approximately 200° F.
12 parts natural asphaltum such as gilsonite (preferably of American origin)
58 parts solvent such as white spirit

*Example 4*

40 parts residual bitumen, with a ring and ball softening point of approximately 220° F.
9 parts rosin modified phenol-formaldehyde resin esterified with glycerine having a ring and ball softening point of 120°–130° C. such as that sold under the registered trademark "Mitchanol IQ"
51 parts solvent, such as white spirit or a suitable coal tar solvent The above compositions may be prepared as follows:

Bitumen and white spirit may be mixed together in a vessel capable of being heated to a temperature of 160° C. and preferably fitted with a refluxing condenser system and a stirrer to distribute efficiently the added cement. The cement is added at any stage after the bitumen white spirit mixture is homogeneous.

Instead of the above composition the following resin/oil varnish may be employed:

*Example 5*

35 parts drying oil of linseed type 30–40 poise viscosity range such as the processed oil known under the name of Plastybcol
25 parts rosin modified phenolic resin as in Example 4
0.1 part manganese napthanate (10% by weight dissolved in white spirit)
0.02 part cobalt napthanate (6% by weight dissolved in white spirit)
38.88 parts solvent, such as white spirit The above varnish may be prepared in the ordinary open cooking pot by the following method:

Heat the oil to 150° C. Add resin and dissolve, increasing the temperature to approximately 180° C. Cool to 140° C. Add driers and solvent.

It is to be understood that different synthetic or natural resins and drying oils may be selected and the proportions of each component varied accordingly.

One or more coatings of the bituminous or oil/resin composition may be applied to the cement coated surface, allowing each coating to dry before another is applied. The final coating may, if desired, contain additional cement which may be added just prior to application.

Also, if desired, a final coating of a composition, bituminous or otherwise, pigmented with metallic paste or powder—for example aluminum—may be applied to the surface. Such coatings have been found an advantage in reflecting the sun's heat, for example from storage tanks, thus effecting some reduction in the temperature of the contents when exposed for long periods to the sun.

It is to be understood that the quantities of the components and the grades selected may be varied to suit individual requirements.

I claim:

1. In the process of producing an anti-corrosive coating on metals which comprises applying to the metal surface at least one coating of an aqueous suspension of a hydratable cement, said suspension containing zinc chromate of the order of 3%, the improvement comprising incorporating in the suspension polyvinyl acetate of the order of 2% of the water employed in the slurry, allowing the coating to dry and applying to the dried coating at least one coating selected from the group consisting of bitumen and synthetic resin in a solvent vehicle.

2. In the process of producing an anti-corrosive coating on metals which comprises applying to the metal surface at least one coating of an aqueous suspension of a hydratable cement, said suspension containing zinc chromate of the order of 3%, the improvement comprising incorporating in the suspension polyvinyl acetate of the order of 2% of the water employed in the slurry, a gelling agent and a soap, allowing the coating to dry and applying to the dried coating at least one coating selected from the group consisting of bitumen and synthetic resin in a solvent vehicle.

References Cited in the file of this patent

UNITED STATES PATENTS

| | | |
|---|---|---|
| 2,231,370 | Reid | Feb. 11, 1941 |
| 2,434,302 | Wertz | Jan. 13, 1948 |
| 2,733,995 | Robinson | Feb. 7, 1956 |
| 2,760,885 | Larsen | Aug. 28, 1956 |
| 2,835,599 | Snyder | May 20, 1958 |

FOREIGN PATENTS

| | | |
|---|---|---|
| 3,527 | Great Britain | AD 1899 |
| 20,227 | Australia | Apr. 16, 1935 |